(12) United States Patent
Schiewe (10) Patent No.: US 9,772,679 B1
(45) Date of Patent: Sep. 26, 2017

(54) OBJECT TRACKING FOR DEVICE INPUT

(71) Applicant: Amazon Technologies, Inc., Reno, NV (US)

(72) Inventor: Robert Schiewe, Lake Forest, CA (US)

(73) Assignee: Amazon Technologies, Inc., Seattle, WA (US)

( * ) Notice: Subject to any disclaimer, the term of this patent is extended or adjusted under 35 U.S.C. 154(b) by 254 days.

(21) Appl. No.: 13/966,967

(22) Filed: Aug. 14, 2013

(51) Int. Cl.
*G06F 3/00* (2006.01)

(52) U.S. Cl.
CPC .................................... *G06F 3/002* (2013.01)

(58) Field of Classification Search
CPC ....... G06T 7/004–7/0048; G06T 7/0004–7/97; G06F 3/016–3/038; G06F 3/002; G06F 3/0421; G09G 5/08
USPC .......... 382/103, 291; 345/156–159, 162, 175
See application file for complete search history.

(56) References Cited

U.S. PATENT DOCUMENTS

| | | | |
|---|---|---|---|
| 2006/0010400 A1* | 1/2006 | Dehlin | G06F 3/0354 715/856 |
| 2009/0231269 A1* | 9/2009 | Ueshima | A63F 13/02 345/156 |
| 2010/0303294 A1* | 12/2010 | Zschau | A61B 3/113 382/103 |
| 2010/0329511 A1* | 12/2010 | Yoon | G06K 9/00382 382/103 |
| 2011/0080490 A1* | 4/2011 | Clarkson | G06F 3/017 348/222.1 |
| 2011/0142353 A1* | 6/2011 | Hoshino | G06K 9/00375 382/203 |
| 2011/0148822 A1* | 6/2011 | Jung | G06F 3/0428 345/175 |
| 2012/0105573 A1* | 5/2012 | Apostolopoulos | H04N 7/142 348/14.08 |
| 2012/0162077 A1* | 6/2012 | Sze | G06F 3/0425 345/163 |

\* cited by examiner

*Primary Examiner* — Amare Mengistu
*Assistant Examiner* — Gloryvid Figueroa-Gibson
(74) *Attorney, Agent, or Firm* — Hogan Lovells US LLP (57) ABSTRACT

Object tracking for device input can be improved by utilizing various tracking parameters to correlate objects between analyzed image frames. In some embodiments, relatively low resolution infrared cameras can be used for object tracking, in order to conserve resources on the device. Intensity segmentation can be used to identify potential objects of interest to be analyzed in captured image data. One or more tracking parameters, such as size, shape, and/or distance, can be specified for each of the objects in order to correlate objects between images. The correlations can be ranked by confidence or other such metrics in order to improve overall accuracy. Tracking data can also be stored for a period of time such that objects that are not clearly distinguishable for a while but then reappear can again be correlated with objects from earlier images.

20 Claims, 7 Drawing Sheets

OBJECT TRACKING FOR DEVICE INPUT

BACKGROUND

People are increasingly utilizing portable electronic devices to perform a wide variety of tasks. While the small size, light weight, and relatively low cost of these devices provide various advantages, these aspects come with certain limitations as well. For example, these devices typically have a limited battery life, such that various compromises are often made in order to conserve power. Further, the limited amount of space and relatively low margins often causes relatively small and inexpensive parts to be used to the extent possible. As an example, certain devices allow for motion or gesture input by tracking the movement of an object over time. As continually capturing and analyzing high-resolution, full color video can be a significant drain on resources, devices may use lower resolution cameras with lower color depth that require less power. A downside to such an approach, however, is that these lower resolution cameras often lead to false positives or other issues in attempting to track an object. The lower resolution cameras often are not able to distinguish between objects, such that various issues can arise when attempting to locate and/or track an object over time.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing input to an electronic device. In particular, various embodiments enable an electronic device to determine various types of input corresponding to motions or gestures performed at a distance from the device and/or by tracking objects at a distance from the device. In at least some embodiments, one or more cameras are used to capture image data (e.g., still images or video), at least a portion of which can be analyzed to determine the position(s) of one or more objects of interest with respect to the computing device. An object of interest can be any appropriate object, such as a hand, head, or fingertip of a user, or an object held by, or otherwise associated with, a user. Subsequent image data can be captured and analyzed in order to track motion of that object, with respect to the computing device through movement of the object and/or the device, over time. In order to conserve resources, relatively low resolution, low color, and/or low power cameras can be used to track an object over time. In some embodiments, the image data can be segmented using an intensity threshold or other such value in order to more quickly identify potential objects of interest. Since the relatively low quality images captured by such cameras can make it difficult to distinguish between these objects, however, it can be desirable in at least some embodiments to determine one or more parameter values for the object of interest, then compare these parameters between frames, or other such points, in order to correlate objects between images. In some embodiments, parameters such as size, shape, and/or distance can be used to correlate objects between images. By correlating the objects, an object of interest can be tracked even when other objects appear in the captured images or when objects appear to merge in the captured images.

Various other applications, processes, and uses are presented below with respect to the various embodiments.

Figure 1:
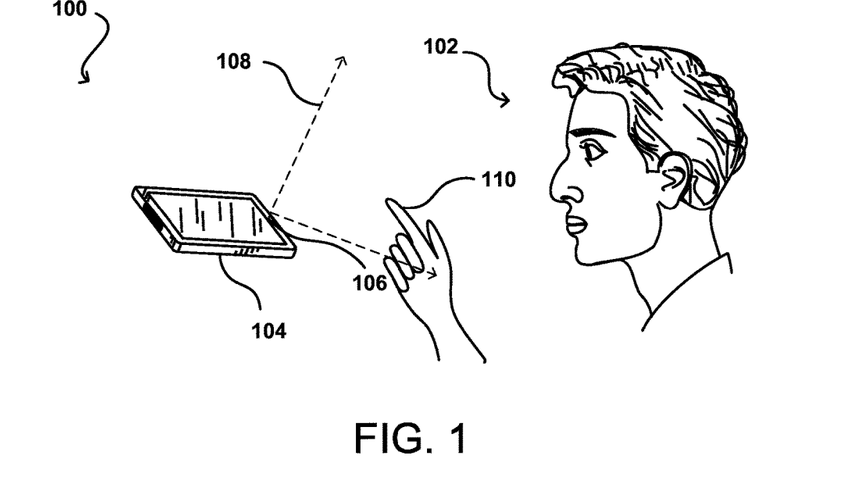
FIG. 1 illustrates an example of a user providing motion- or gesture-based input that can be utilized in accordance with various embodiments.

FIG. 1 illustrates an example situation 100 wherein a user 102 is interacting with a computing device 104. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, desktop computers, notebook computers, personal data assistants, cellular phones, video gaming consoles or controllers, smart televisions, a wearable computer (e.g., a smart watch or glasses), and portable media players, among others. In this example, the computing device 104 has at least one image capture element 106, such as a camera or camera sensor, operable to perform functions such as image and/or video capture. Each image capture element may be, for example, a charge-coupled device (CCD), a motion detection sensor, or an infrared sensor, or can utilize another appropriate image capturing technology. In this example, the user 102 is using a fingertip 110 to attempt to provide input to the device. In at least some embodiments, the user might be able to move the fingertip relative to the computing device 104, but within a field of view of at least one image capture element 108 of the computing device, to provide motion and/or gesture input to the computing device. As an example, a user might be able to navigate and interface or play a game on the device through movement of the fingertip 110 relative to the device.

In many instances, the user's finger can be tracked by capturing images using a relatively high resolution (e.g., at least 6.0 megapixels) camera with a relatively high color depth (e.g., 24-bit color) that might be present on a typical computing device. Using such a camera can provide a large amount of data to analyze, however, such that the tracking can involve a significant amount of processing capacity and battery power, which can be particularly undesirable for devices such as small portable computing devices.

Accordingly, approaches in accordance with various embodiments can instead use one or more relatively low resolution (e.g., less than 2.0 megapixels) and/or low color depth (e.g., 8-bit or less) cameras to attempt to track one or more objects with respect to a computing device. In some embodiments, one or more infrared (IR) cameras, or cameras capable of detecting light over a band of wavelengths at least including IR, can be used to attempt to track an object over time. At least one IR emitter can be used to emit IR light over at least a determined angular range, and IR reflected from various objects can then be detected by the one or more IR cameras.

Figure 2A:
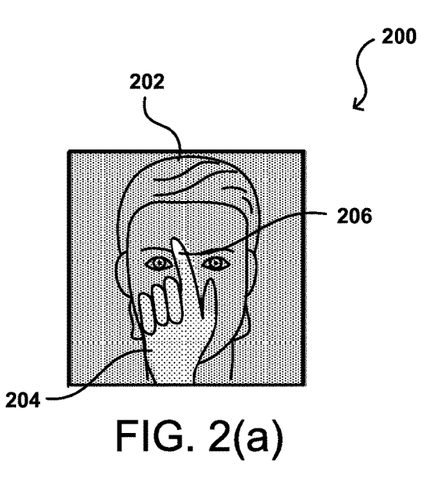
FIGS. 2(a) and 2(b) illustrate an example situation wherein intensity segmentation can be used to identify an object represented in an image in accordance with various embodiments.

An advantage to using IR is that the cameras are relatively robust to changes in lighting conditions, as the IR sensors may not detect ambient light, or the sensors (or device) might be able to filter out the ambient light. Further, using an IR emitter has the advantage that the IR emitter will act as a single point source in at least some embodiments, such that objects closer to the IR emitter will appear brighter in the captured image(s) than objects further from the IR emitter. As an example, FIG. 2(a) illustrates an example image 200 that might be captured by an IR camera or IR sensor in accordance with various embodiments. In this example the user's fingertip 206 is the closest object to the device (i.e., the IR camera and emitter), such that the fingertip appears as the brightest region of the image 200. The next closest object is the user's hand 204, which is less bright in the image, and then the user's head 202 and the background, which are even less bright in the image.

Figure 2B:
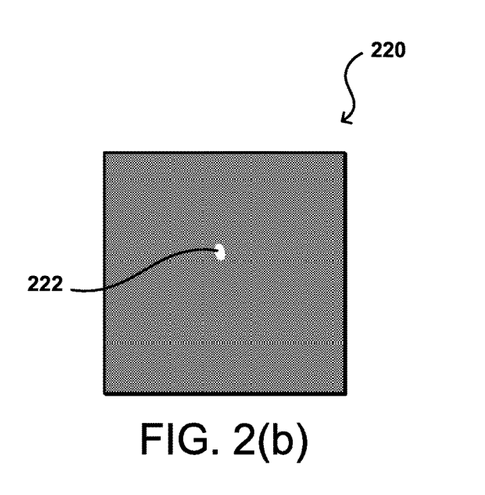

Differences in intensity can be indicative of differences in distance, as the IR intensity falls off with distance, such that portions of the image can be grouped into different objects based at least in part upon relative intensity levels. There can be many objects visible in an image, however, such that there still can be a significant amount of processing. Accordingly, approaches in accordance with various embodiments can utilize a segmentation threshold or other such filter or value to separate what can be considered as "foreground" objects, or likely objects of interest, from objects in the background of the image. As an object used to provide input to the device will generally be the closest object (or one of the closest objects) to the device, from at least an input location or direction (i.e., not in the direction of a table or hand upon which the device is resting), a threshold can be used to quickly narrow the regions of the image that need to be analyzed to assist in tracking an object over time. For example, a segmentation threshold of 10% might be applied to the image data for the image of FIG. 2(a) to generate image data as illustrated in the example image 220 of FIG. 2(b), wherein only that portion 222 of the image corresponding to the fingertip remains, as the intensity of the fingertip is the only portion of the image that exceeded the segmentation threshold. Such an approach in at least some embodiments can help to isolate the object of interest (e.g., a hand, head, finger(s), stylus, etc.) such that little extra effort needs to be spent locating the current position of that object.

In some embodiments, an absolute threshold might be set for purposes of object detection and tracking. For example, if the intensity scale is normalized from a value of 0 to 1, with 1 being the highest intensity value possible, the threshold might be set to 0.8. In some embodiments, the threshold might be relative, such as 80% of the highest intensity value in the image. Because a captured image might have noise or spurious values that might be artificially high, in some embodiments the threshold might be lowered, until a minimum threshold value, for example, until at least one distinct object is detected in the image data, such as an object with a minimum size or having a specified type of shapes. The minimum threshold can be specified to prevent noise or other such features from being improperly interpreted as an object for tracking. Various other thresholds or criteria can be used as well within the scope of the various embodiments.

Figures 3A, 3B:
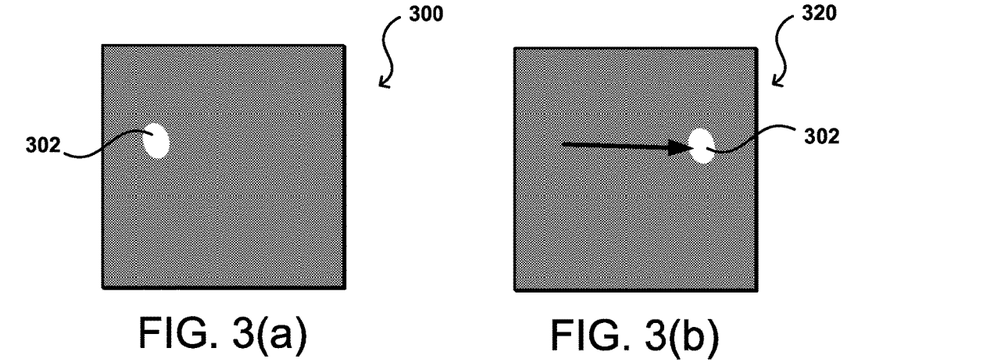
FIGS. 3(a), 3(b), 3(c), 3(d), and 3(e) illustrate example situations where it can be difficult to track an object using intensity segmentation.

In many instances, a threshold-based approach can be sufficient for simplified and/or low power object tracking. As an example, FIG. 3(a) illustrates an example of a first image 300 captured at a first time, where an intensity threshold has been applied. It should be understood that other thresholds can be applied as well within the scope of the various embodiments, such as may include color thresholds, pixel value thresholds, and the like. In this example, an object region 302 is visible that corresponds to the object with intensity above the threshold, which is likely the closest object to the device and, thus, likely the object of interest. FIG. 3(b) illustrates a second example image 320 where a similar segmentation threshold has been applied. As can be seen, a similar object region 302 is visible in the second image 320, but the region is offset with respect to the location of the region in the first image 300. The offset is due at least in part to motion of the object or the device between the time of capture of the first image and the time of capture of the second image. In at least some embodiments, a motion sensor such as an accelerometer, gyroscope, inertial sensor, or other such component can attempt to detect motion of the device during that time, which can be accounted for in order to help determine an extent to which the apparent motion of the object between the first image and the second image is due to movement of the device and not the object. The portion of the movement allocated to the object then can be determined.

For simple two-dimensional gestures, knowing the portion of the movement allocated to the object being tracked can be sufficient to enable that object to provide input to the device. For example, the motion from left to right between the first and second images can be sufficient to provide a "right" input (or left, depending on point of view) to the device.

Figure 3C:
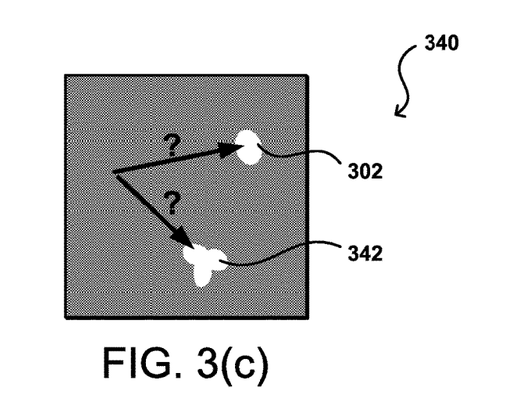

It may often be the case, however, that one or more other objects might appear in a subsequent image, or disappear in a subsequent image. For example, consider the example image 340 of FIG. 3(c). In this example, there are two potential object regions 302, 342 visible, where the intensity meets or exceeds the intensity threshold. These objects, sometimes referred to as "blobs," are defined as objects because they have a minimum or appropriate size or shape after intensity thresholding, and they are separated by a sufficient distance by an area with less than the utilized intensity threshold. The second region might appear due to any of a number of reasons, such as another object coming within a distance of the device, an object being reflective and thus providing a greater percentage of reflected IR, or a number of other possibilities. When there are multiple such objects in the image, it can be difficult for the device to determine which of the objects corresponds to the object that was being tracked in the first image 300.

Figure 3D:
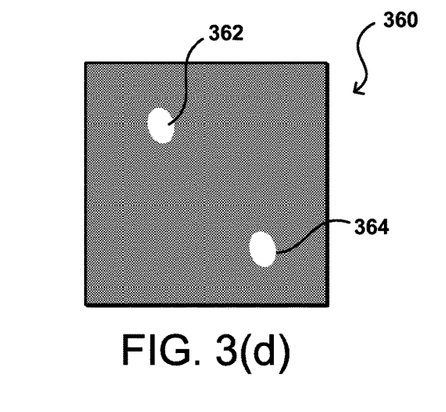
Figure 3E:
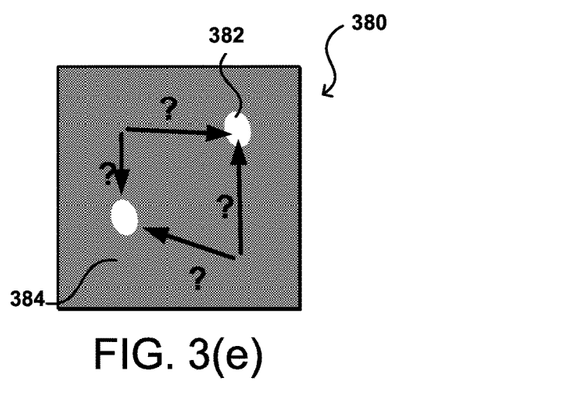

Similarly, when there are multiple objects being tracked it can sometimes be difficult to distinguish between the objects over time. For example, in the example image 360 of FIG. 3(d) there are two object regions 362, 364 that exceed the segmentation threshold. A subsequent image 380 with the segmentation threshold applied is illustrated in FIG. 3(e). It can be seen that there are also two object regions 382, 384 in this image that likely correspond to the object regions 362, 364 in the previous image 360. Based on the images alone, however, it is difficult to determine which of the regions 382, 384 in the second image corresponds to which region 362, 364 in the previous image. Thus, it can be seen that intensity segmentation alone is not sufficient for object tracking in at least some circumstances.

Accordingly, approaches in accordance with various embodiments can attempt to obtain, determine, and/or utilize additional information about detected objects in order to distinguish between those objects, enabling a computing device to track those objects over time. For example, various embodiments can utilize information such as size, shape, and/or distance to help distinguish between objects in an image. In some embodiments, consecutive selected images or captured frames of video can be analyzed to locate objects in each image, such as by using a segmentation threshold to isolate potential objects of interest. The objects in each of the images then can be compared to attempt to match each object in the first image to a corresponding object in the second image, to the extent possible. In addition to the relative two-dimensional location obtained from a conventional image, for example, additional information can be used that can help to correlate objects in each image. For example, the determined distance of each object can be used to attempt to correlate the objects. Information about the objects themselves, such as the apparent size or shape in the images, can also be used to correlate objects. Other information can be used as well, such as ballistic data that can include information about the trajectory, relative speed, acceleration, or direction of motion, for example, as well as the predicted location of each object in a subsequently analyzed image. Various other types of information can be also used within the scope of the various embodiments. By correlating objects between images, an object detection and/or tracking routine can be less susceptible to false positives due to noise, lighting variations, reflections, new objects, objects passing near to each other, and other such issues with conventional object tracking processes. In some embodiments, a buffer of such data may be maintained in order to differentiate between objects when objects pass near to each other and appear as a single object in the image, and then separate back into distinguishable objects in the images. The shape and size values can be allowed to change by a determined amount in various embodiments, to account for occurrences such as object rotations, lateral translations, and the like.

Figure 4A:
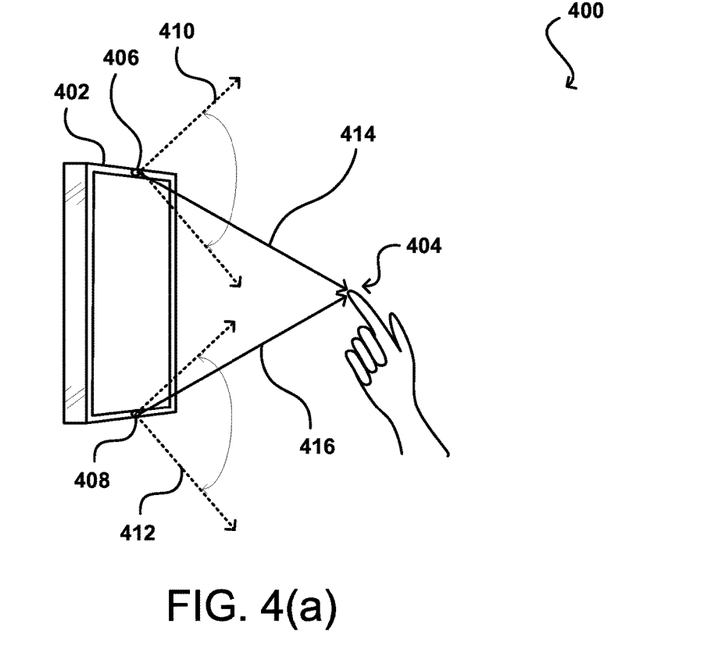
FIGS. 4(a), 4(b), and 4(c) illustrate an example process for determining position of an object that can be utilized in accordance with various embodiments.
Figure 4B:
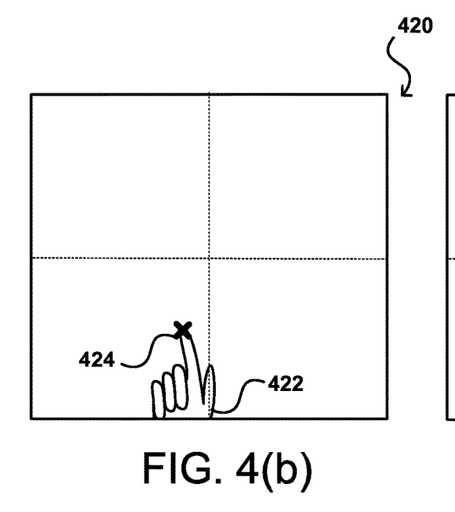
Figure 4C:
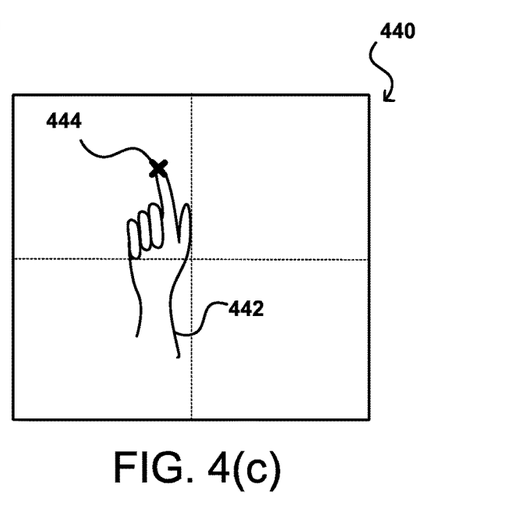

In some embodiments, distance information can be obtained by using a distance sensor in addition to a camera, and then correlating the distances with the objects detected in the captured images. These distance sensors can include, for example, proximity sensors, ultrasonic sensors, time-of-flight sensors, and the like. In other embodiments, stereoscopic imaging or other such approaches can utilize two or more cameras or sensors to attempt to capture three-dimensional image data. FIGS. 4(*a*), 4(*b*), and 4(*c*) illustrate one example approach to determining a relative location of at least one feature (e.g., a fingertip, head, or hand) or object (e.g., stylus or remote control) that can be utilized in accordance with various embodiments. In this example, input can be provided to a computing device 402 via the device monitoring the position of the user's fingertip 404 with respect to the device. The illustrated computing device 402 in this example instead includes at least two different image capture elements 406, 408 positioned on the device with a sufficient separation such that the device can utilize stereoscopic imaging (or another such approach) to determine a relative position of one or more features or objects with respect to the device in three dimensions. Although two cameras are illustrated near a top and bottom of the device in this example, it should be understood that there can be additional or alternative imaging elements of the same or a different type at various other locations on the device within the scope of the various embodiments. The cameras can include ambient light cameras, infrared cameras, grayscale cameras, and the like. Further, it should be understood that terms such as "top" and "upper" are used for clarity of explanation and are not intended to require specific orientations unless otherwise stated.

In this example, the upper camera 406 is able to see the fingertip 404 of the user as long as that feature is within a field of view 410 of the upper camera 406 and there are no obstructions between the upper camera and those features. If software executing on the computing device (or otherwise in communication with the computing device) is able to determine information such as the angular field of view of the camera, the zoom level at which the information is currently being captured, and any other such relevant information, the software can determine an approximate direction 414 of the fingertip with respect to the upper camera. A second camera is used to assist with location determination as well as to enable distance determinations through stereoscopic imaging. The lower camera 408 in FIG. 4(*a*) is also able to image the fingertip 404 as long as the feature is at least partially within the field of view 412 of the lower camera 408. Using a similar process to that described above, appropriate software can analyze the image information captured by the lower camera to determine an approximate direction 416 to the user's fingertip. The direction can be determined, in at least some embodiments, by looking at a distance from a center (or other) point of the image and comparing that to the angular measure of the field of view of the camera. For example, a feature in the middle of a captured image is likely directly in front of the respective capture element. If the feature is at the very edge of the image, then the feature is likely at a 45 degree angle from a vector orthogonal to the image plane of the capture element. Positions between the edge and the center correspond to intermediate angles as would be apparent to one of ordinary skill in the art, and as known in the art for stereoscopic imaging. Once the direction vectors from at least two image capture elements are determined for a given feature, the intersection point of those vectors can be determined, which corresponds to the approximate relative position in three dimensions of the respective feature.

A measure of the distance to the fingertip 404 in this example can also, or alternatively, be determined by looking at the amount of disparity present for the fingertip between an image captured by the upper camera 406 and an image concurrently captured by the lower camera 408. As is known for stereoscopic imaging, the lateral offset between the upper camera 406 and the lower camera 408 causes the fingertip to appear in a different location in images captured by each of the cameras. This difference in location is often referred to as the amount of disparity for the fingertip, where the amount of disparity decreases with an increase in distance of the fingertip from the device. If the upper and lower cameras are properly aligned, such as where the primary optical axes of the cameras are substantially parallel and/or any misalignment has been accounted for through calibration, then knowing the offset between the cameras enables the distance of the object from the device to be determined using the amount of disparity for the object. Thus, if there are two objects detected in an image and the corresponding physical objects are at different distances from the device, then the objects in the image can be distinguished and correlated with the appropriate physical objects by examining the relative disparity of each object.

Further illustrating such an example approach, FIGS. 4(b) and 4(c) illustrate example images 420, 440 that could be captured of the fingertip using the cameras 406, 408 of FIG. 4(a). In this example, FIG. 4(b) illustrates an example image 420 that could be captured using the upper camera 406 in FIG. 4(a). One or more image analysis algorithms can be used to analyze the image to perform pattern recognition, shape recognition, or another such process to identify a feature of interest, such as the user's fingertip, thumb, hand, or other such feature. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. Upon identifying the feature, here the user's hand 422, at least one point of interest 424, here the tip of the user's index finger, is determined. As discussed above, the software can use the location of this point with information about the camera to determine a relative direction to the fingertip. A similar approach can be used with the image 440 captured by the lower camera 408 as illustrated in FIG. 4(c), where the hand 442 is located and a direction to the corresponding point 444 determined. FIGS. 4(b) and 4(c) illustrate the offsets in the relative positions of the features due at least in part to the separation of the cameras. By looking for the intersection of the direction vectors to determine the position of the fingertip in three dimensions, a corresponding input can be determined within a determined level of accuracy. If higher accuracy is needed, higher resolution and/or additional elements can be used in various embodiments. Further, any other stereoscopic or similar approach for determining relative positions in three dimensions can be used as well within the scope of the various embodiments.

Figures 5A, 5B:
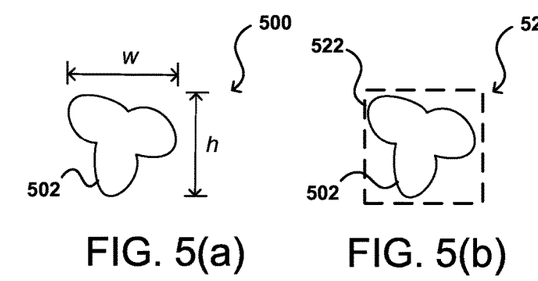
FIGS. 5(a), 5(b), and 5(c) illustrate example parameters that can be utilized to track an object in accordance with various embodiments.

Other approaches to distinguishing between objects can be used as well within the scope of the various embodiments. For example, the relative size of each object can be determined, and used to differentiate between objects in a subsequent image. As an example, FIG. 5(a) illustrates an example 500 wherein one or more dimensions of an object in an image can be determined. In this particular example, dimensions such as height and width can be determined. The height and width of various objects in an image can then be used to correlate objects with objects detected in earlier images. Changes in the dimensions also can be tracked, as objects can get closer to, or further away from, the device, which can change the amount of IR that is reflected back to the device. If an object is moving closer to the device, that information can also be used to predict the size of the object in a subsequent image, in order to improve the correlation accuracy. Because objects can change in orientation due to movements and/or rotations of an object, other dimensions might be used as well, such as the maximum diameter and minimum diameter across an object, a range or histogram of diameters, etc.

Figure 5C:
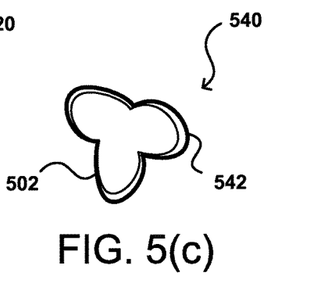

Other embodiments can take different approaches to using size to correlate objects between images. For example, FIG. 5(b) illustrates an example situation 520 wherein a bounding box 522 (actual or mathematical) is determined for an object 502, which gives an indication of the relative size of the object. The use of a bounding box can be advantageous as it can require relatively few resources to calculate and track, and many devices already include bounding box generating software. A disadvantage, however, is that a bounding box can provide relatively little additional information, particularly for objects with relatively complex shapes and/or similar sizes. For example, if a user is playing with two hands then each hand will have approximately the same size bounding box in many situations (depending on the relative orientation and way the user is holding the hands, etc.). Thus, in other embodiments a more complex shape determining algorithm can be used that instead determines and stores a general shape of an object in an image for comparison with a subsequent image. As an example, FIG. 5(c) illustrates an example situation 540 wherein the general shape of the object 502 in an image is determined, and a template 542 or other indicator of the shape stored at least in resident memory for use in correlating that object with an object in a subsequent image. The shape can be determined using any appropriate algorithm, such as a contour detection algorithm, edge detection algorithm, pattern matching algorithm, and the like. An amount of tolerance, such as a percentage amount, in shape between images can be allowed, in order to account for motion of the object or device, and other such factors. In some embodiments, the motion of the object can be tracked and used to predict future changes in the shape of the object as represented in a subsequent image in order to improve the correlation. In some embodiments, the relative orientations of a set of feature points, transition points, or other such locations can be tracked instead of an overall shape or contour, in order to minimize the calculation and/or comparison for object correlation.

Figure 6A:
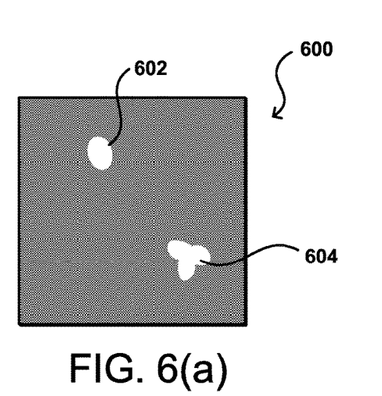
FIGS. 6(a), 6(b), 6(c), and 6(d) illustrate an example situation where object can appear to merge that can be analyzed in accordance with various embodiments.
Figure 6B:
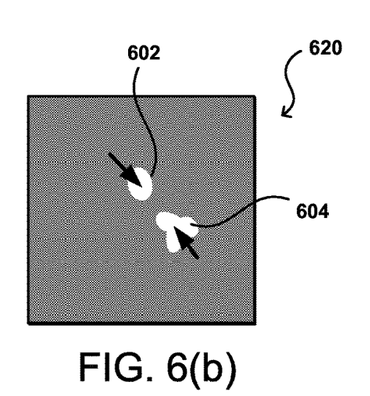
Figure 6C:
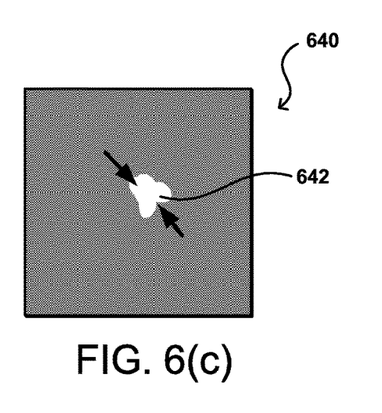

In some cases, however, even knowing information such as the relative size, shape, and distance to one or more objects may not be sufficient for object tracking and differentiation. For example, the situation illustrated in FIGS. 6(a)-6(d) demonstrates how the tracking of two objects can become increasingly difficult as those objects move towards each other. In FIG. 6(a), there are two objects 602, 604 detected in an image 600 after intensity segmentation. FIG. 6(b) illustrates a subsequent image 620 showing that the objects are moving closer together, at least within the plane of the image. Any of the various approaches discussed herein can be used to compare the objects 602, 604 in each image to correlate those objects with the objects in the earlier image. For example, the shape and or size of each object is significantly different, which enables a relative easy correlation. In FIG. 6(c), however, the objects have moved such that the objects 602, 604 to longer appear as separate, independent objects but instead appear as a single object 642 in the subsequent image, where that single object 642 does not match the size or shape of the individual objects. This can happen when, for example, two hands of a user are being tracked and the user brings those hands together, or when two users are playing using their fingertips and one user hands something to the other user.

Figure 6D:
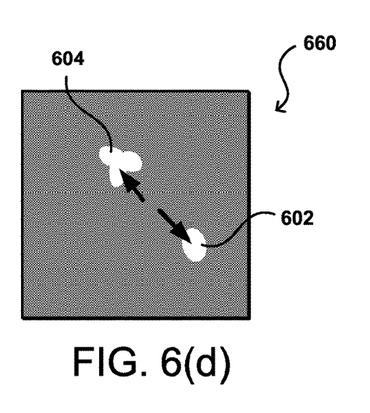

As discussed elsewhere herein, a buffer or amount of recent object data can be maintained in order to attempt to resolve these and other such issues. For example, the objects might continue to move in the same direction, or might move in another direction, such as where a user pulls his or her hands apart. FIG. 6(d) illustrates one such example image 660, wherein the objects 602, 604 are again separately distinguishable. If the process only compared objects in one frame against objects in the previous frame, then the process might not be able to correlate the objects in FIG. 6(d) with the objects that were tracked in FIGS. 6(a) and 6(b). If, however, the process at least temporarily stores information such as the size or shape of each of the objects, the process can again correlate those objects when those objects appear separately. Some embodiments can also use motion of the objects to account for combined objects in an image, and in some cases can consider the overlay of the size and/or shape of one of the objects over the other to determine that those objects are likely in approximately the same location. Various other such approaches can be used as well within the scope of the various embodiments.

Figure 7:
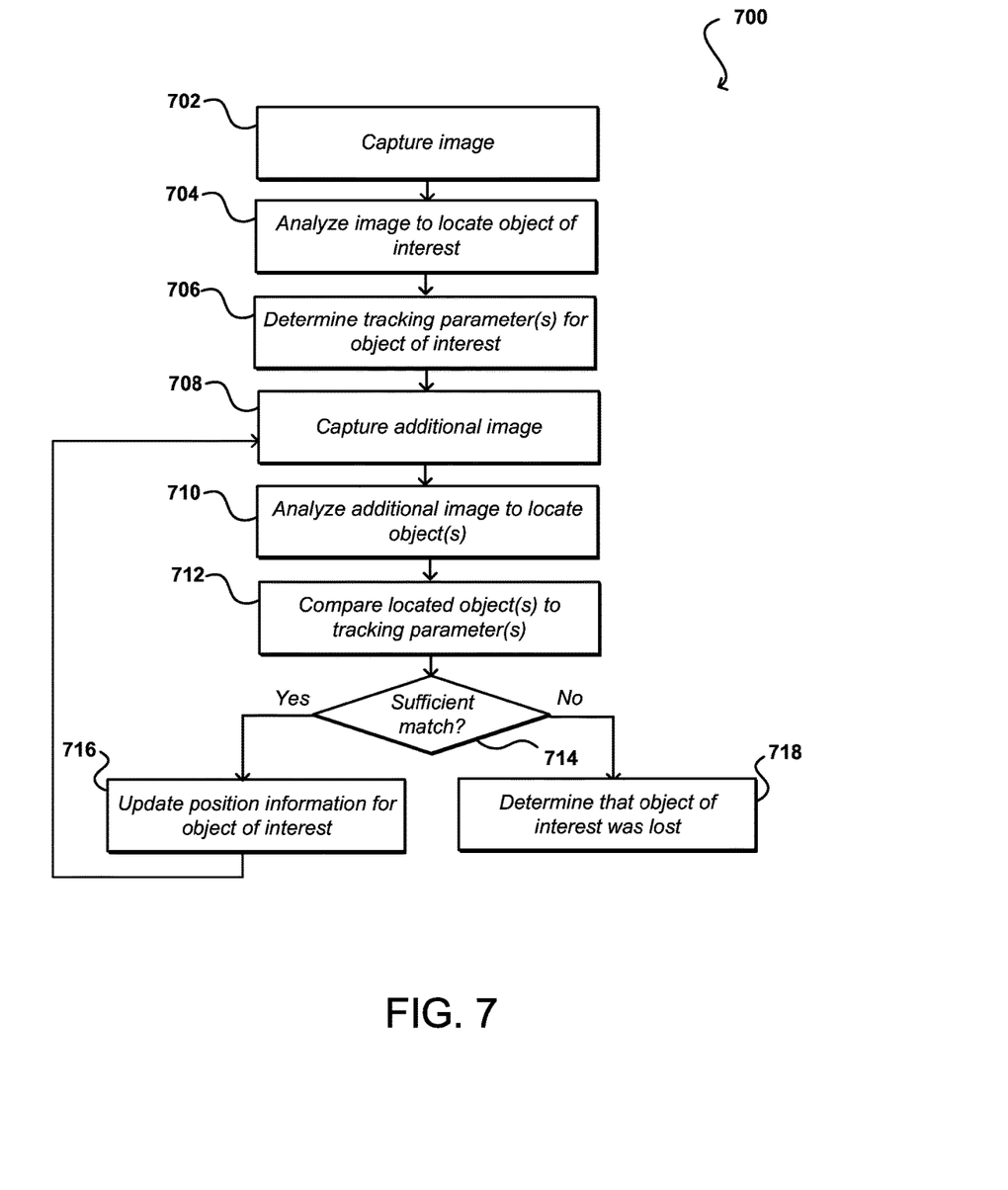
FIG. 7 illustrates an example process for tracking an object that can be used in accordance with various embodiments.

FIG. 7 illustrates an example process 700 for tracking one or more objects with respect to a computing device that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, object tracking is activated on a computing device. The tracking can be activated manually, by a user, or automatically in response to an application, activation, startup, or other such action. Further, the feature that the process tracks can be specified or adjusted by a user, provider, or other such entity, and can include any appropriate feature such as a fingertip, hand, thumb, elbow, or other such feature. In other embodiments, the feature that results in the most prominent and/or central object in a tracked image can automatically be selected for input.

During the process, one or more selected cameras can capture an image 702, or image data, as discussed elsewhere herein. The selected cameras can have fields of view that include at least a portion of the region near a display element or other specified area of the device, such that the cameras can image a feature when approaching that element or area. The captured image data, which can be a single image, set of images, stereoscopic image data, a stream of video information in various embodiments, can be analyzed 704 to attempt to determine or locate an object of interest, and determine the relative location of that object, such as the relative position of the user's index finger tip of a visible hand. As discussed elsewhere herein, this can include applying a segmentation threshold to the image data and analyzing the remaining intensity data to identify one or more objects in the image data. When the object is located, one or more tracking parameters can be determined 706. These can include, for example, the size and shape of the object in the image and/or the relative position of the corresponding physical feature. The current value of the tracking parameters for each object of interest then can be stored for tracking and/or other such purposes.

An least one additional image can be captured 708, typically using the same camera(s) as for the previous image(s), although different cameras with different fields of view might be used to capture moving objects in at least some embodiments. The additional image(s) can be analyzed 710 to attempt to locate one or more objects in the additional images(s). Again, an intensity threshold might again be applied to assist with the determination. As discussed elsewhere herein, various size, shape, or other such factors may be applied in order to determine whether an object in the image is an object of interest that can and/or should be tracked for device input or other such purposes. For each object of interest in the additional image(s), those objects can be compared 712 to the objects in the previous image, or at least the tracking parameters for the objects in the previous image. This can include, for example, comparing the location, size, and/or shape of the object to attempt to match each object in the additional image with an object in the previous image. In some embodiments this can include applying numbers or identifiers to each of the objects and correlating those objects by rank, such that overall each object in the additional image is matched with its closest object in the previous image. Thus, if there are ten objects being tracked it is possible that one of the objects might have a closer match to a different object in a previous image, but if overall the objects are correlated starting from the highest confidence to the lowest confidence correlations, for example, then the results can be more consistent on average and can reduce the likelihood of object tracking jumping around or returning false correlations. In some embodiments, the object of interest with the highest confidence value between frames can be utilized as a reference point for matching or correlating the other objects in the image data.

If, after the correlation process, an object of interest can be located in the additional image(s) with sufficient confidence, then that object can be determined 714 to be a sufficient match, and the position information for that information can be updated 716 to the device. Other information can be updated as well, such as the current size or shape visible in the most recent image, the current distance to the object, etc. If the objects cannot be correlated with sufficient confidence, such as where the object does not have a match or the size, shape, and/or location exceed an allowable deviation from the previous image, then it can be determined 718 that the object of interest was lost and tracking of that object can be stopped. As discussed, however, in some embodiments the object data and/or tracking parameters can be stored for a period of time in case the object subsequently appears in additional image data.

In some embodiments, the device can perform three-dimensional modeling of the environment including the user's fingers and head positions, such as by utilizing stereo cameras or a distance sensor with a camera, etc. The three-dimensional modeling can provide very accurate results, but also can be very computationally expensive for certain devices.

As mentioned, various approaches can be used to attempt to locate and track specific features over time. One such approach utilizes ambient-light imaging with a digital camera (still or video) to capture images for analysis. In at least some instances, however, ambient light images can include information for a number of different objects and thus can be very processor and time intensive to analyze. For example, an image analysis algorithm might have to differentiate the hand from various other objects in an image, and would have to identify the hand as a hand, regardless of the hand's orientation. Such an approach can require shape or contour matching, for example, which can still be relatively processor intensive. A less processor intensive approach can involve separating the hand from the background before analysis.

In at least some embodiments, a light emitting diode (LED) or other source of illumination can be triggered to produce illumination over a short period of time in which an image capture element is going to be capturing image information. The LED can illuminate a feature relatively close to the device much more than other elements further away, such that a background portion of the image can be substantially dark (or otherwise, depending on the implementation). In one example, an LED or other source of illumination is activated (e.g., flashed or strobed) during a time of image capture of at least one camera or sensor. If the user's hand is relatively close to the device the hand will appear relatively bright in the image. Accordingly, the background images will appear relatively, if not almost entirely, dark. This approach can be particularly beneficial for infrared (IR) imaging in at least some embodiments. Such an image can be much easier to analyze, as the hand has been effectively separated out from the background, and thus can be easier to track through the various images. Further, there is a smaller portion of the image to analyze to attempt to determine relevant features for tracking. In embodiments where the detection time is short, there will be relatively little power drained by flashing the LED in at least some embodiments, even though the LED itself might be relatively power hungry per unit time.

Such an approach can work both in bright or dark conditions. A light sensor can be used in at least some embodiments to determine when illumination is needed due at least in part to lighting concerns. In other embodiments, a device might look at factors such as the amount of time needed to process images under current conditions to determine when to pulse or strobe the LED. In still other embodiments, the device might utilize the pulsed lighting when there is at least a minimum amount of charge remaining on the battery, after which the LED might not fire unless directed by the user or an application, etc. In some embodiments, the amount of power needed to illuminate and capture information using the gesture sensor with a short detection time can be less than the amount of power needed to capture an ambient light image with a rolling shutter camera without illumination.

It also should be understood that it can also be important in at least some embodiments for the software to know the relative position of the cameras or other image capture elements on the device. For example, image information can be analyzed to determine directions or position vectors to features, but those determinations are relative to a center point (or other position) of the camera capturing that image information. In order to properly combine the vectors from different images to determine an intersection point, the separation between the cameras capturing those images should also be taken into account in at least some embodiments. Various approaches for three-dimensional mapping or modeling using stereoscopic imaging or other such approaches based at least in part upon camera separation can be used as known or used in the art. Other approaches such as active capacitive, passive capacitive, and ultrasonic approaches can be used for finger detection, and processes such as ambient or IR imaging, at one or more wavelengths, can be used for eye detection, among other such processes.

In some embodiments, a computing device might utilize one or more motion-determining elements, such as an electronic gyroscope, to attempt to assist with location determinations. For example, a rotation of a device can cause a rapid shift in objects represented in an image, which might be faster than a position tracking algorithm can process. By determining movements of the device during image capture, effects of the device movement can be removed to provide more accurate three-dimensional position information for the tracked user features.

Figure 8:
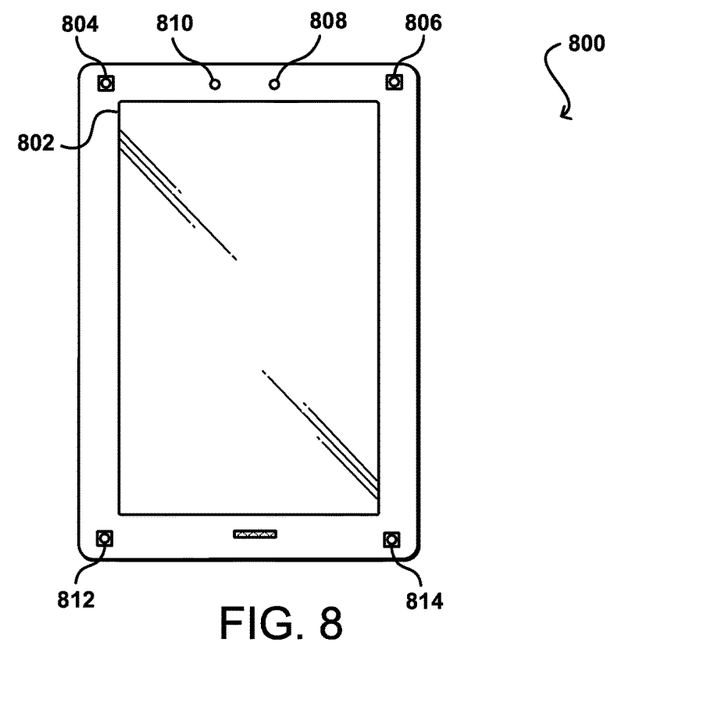
FIG. 8 illustrates an example computing device that can be used in accordance with various embodiments.

FIG. 8 illustrates an example computing device 800 that can be used to perform methods in accordance with various embodiments discussed and suggested herein. In this example, the device has four image capture elements 804, 806, 812, 814 positioned at various locations on the same side of the device as a display element 802, enabling the device to capture image information about a user of the device during typical operation where the user is at least partially in front of the display element. In this example, each capture element is a camera capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, a light sensor 808 is included that can be used to determine an amount of light in a general direction of objects to be captured and at least one illumination element 810, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. In some embodiments, there can be an emitter for each of the image capture elements 804, 806, 812, 814, with each emitter positioned proximate the respective image capture element. Various other elements and combinations of elements can be used as well within the scope of the various embodiments as should be apparent in light of the teachings and suggestions contained herein.

Figure 9:
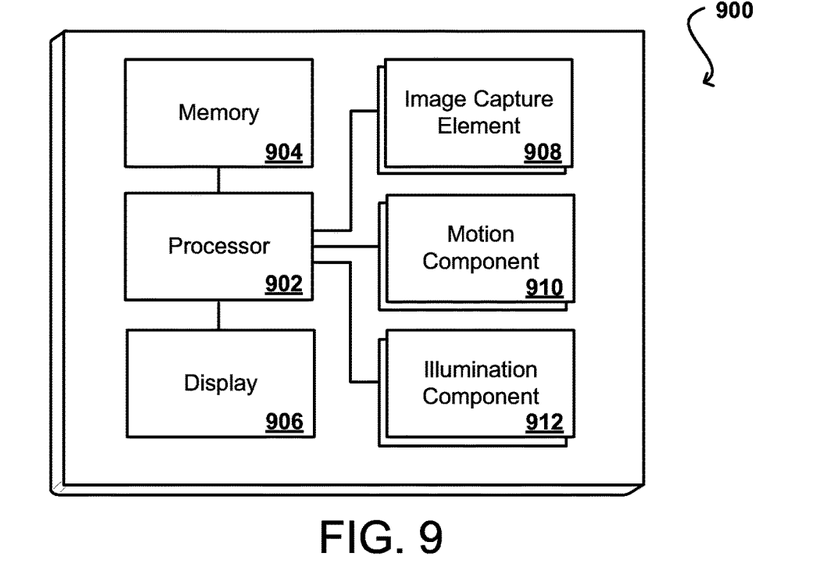
FIG. 9 illustrates an example configuration of components of a computing device such as that illustrated in FIG. 8.

In order to provide various functionality described herein, FIG. 9 illustrates an example set of basic components of a computing device 900, such as the device 800 described with respect to FIG. 8. In this example, the device includes at least one central processor 902 for executing instructions that can be stored in at least one memory device or element 904. As would be apparent to one of ordinary skill in the art, the device can include many types of memory, data storage or non-transitory computer-readable storage media, such as a first data storage for program instructions for execution by the processor 902, the same or separate storage can be used for images or data, a removable storage memory can be available for sharing information with other devices, etc. The device typically will include some type of display element 906, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 908, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example device includes at least one motion determining component 910, such as an electronic gyroscope used to determine motion of the device for assistance in input determination. The device also can include at least one illumination element 912, as may include one or more light sources (e.g., white light LEDs, IR emitters, or flash lamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 10:
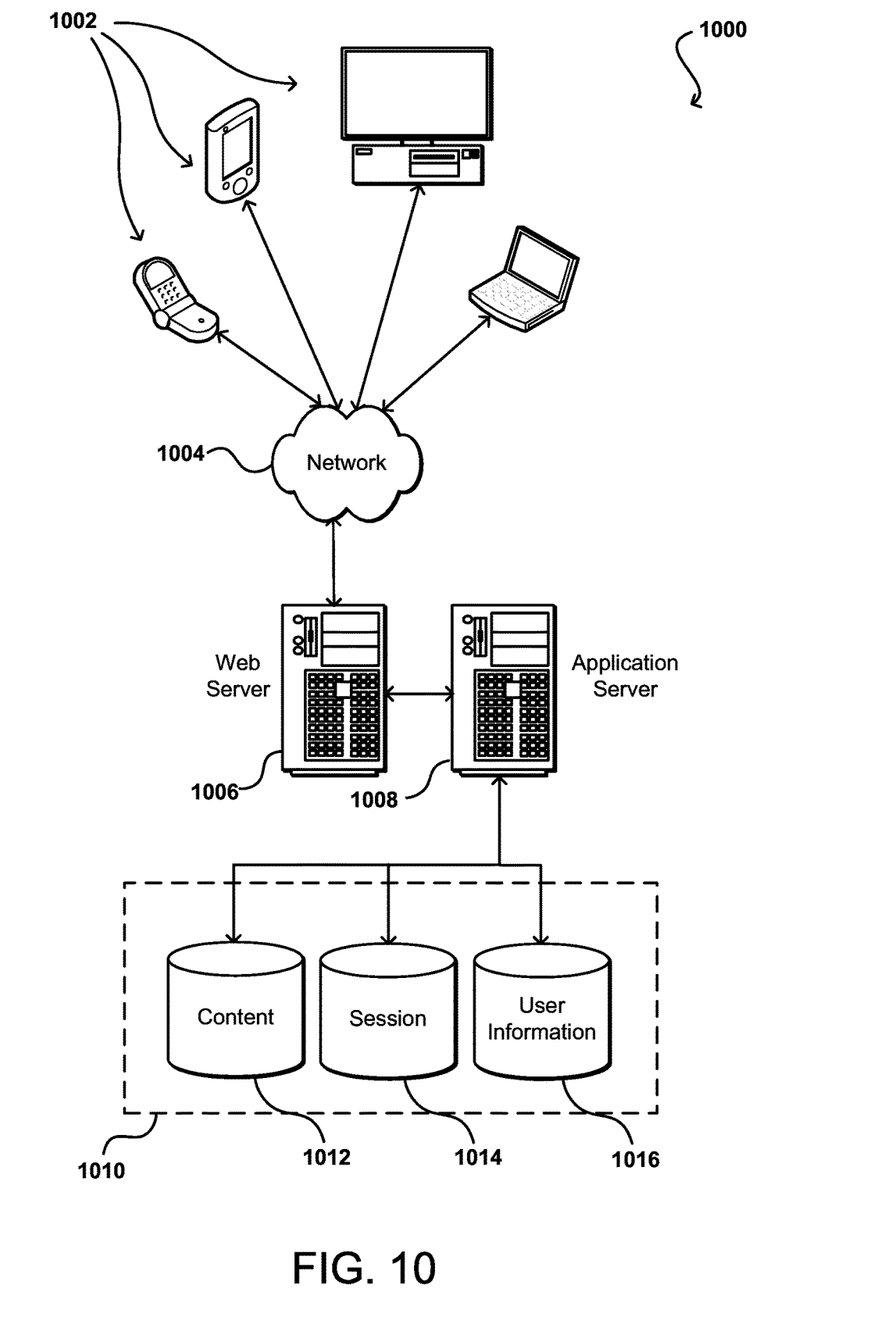
FIG. 10 illustrates an example environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS.

The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   an infrared (IR) emitter;
   a pair of cameras configured to capture stereoscopic images including detected infrared intensity data; and
   memory including instructions that, when executed by the at least one processor, cause the computing device to:
   acquire first stereoscopic image data using the pair of cameras, the first stereoscopic image data being acquired while IR is being emitted from the IR emitter;
   apply a segmentation threshold to the first stereoscopic image data, the segmentation threshold being adjusted from an initial value to isolate regions of the first stereoscopic image data having at least a minimum intensity value;
   identify a first object and a second object in the first stereoscopic image data, each object of the first object and the second object corresponding to a respective region of the isolated regions;
   store a first indicator of a shape corresponding to the first object and a second indicator of a shape corresponding to the second object;
   determine first position information for each object of the first object and the second object in the first stereoscopic image data, the first position information including distance information from the first stereoscopic image data;
   acquire second stereoscopic image data using the pair of cameras, the second stereoscopic image data being acquired while IR is being emitted from the IR emitter;
   apply the segmentation threshold to the second stereoscopic image data to isolate regions of the second stereoscopic image data having at least the minimum intensity value;
   identify a third object and a fourth object in the second stereoscopic image data, each object of the third object and the fourth object corresponding to a respective region of the isolated regions;
   determine a third indicator of a shape corresponding to the third object and a fourth indicator of a shape corresponding to the fourth object;
   correlate the third object with the first object, and the fourth object with the second object, based at least in part upon the distance information and a determination that the third indicator of a shape matches the stored first indicator of a shape within a threshold amount of tolerance, the correlation of the third object with the first object including a highest confidence correlation and the correlation of the fourth object with the second object including a lowest confidence correlation; and provide updated position information for each of the first object and the second object based at least in part upon, respectively, a position of the third object and the fourth object.

2. The computing device of claim 1, wherein the instructions when executed further cause the computing device to:
determine at least one additional tracking parameter for each object of the first object and the second object, the at least one additional tracking parameter including at least one of a size, a shape, a velocity of motion, or a direction of motion,
wherein correlating the third object with the first object, and the fourth object with the second object, is further based at least in part upon matching the at least one additional tracking parameter.

3. The computing device of claim 1, wherein the instructions when executed further cause the computing device to:
determine that each object of the first object and the second object is an object of interest before determining first position information for each object of the first object and the second object in the first stereoscopic image data.

4. The computing device of claim 1, further comprising:
at least one motion sensor, the instructions when executed further enabling the computing device to account for any change in determined position of at least one of the first object or the second object attributable to motion of the computing device.

5. The computing device of claim 1, wherein the instructions when executed further cause the computing device to:
eliminate from consideration one or more of the regions of the first stereoscopic image data, having less than a minimum object size or a shape outside an allowable range of shapes, before determining the first position information.

6. A computer-implemented method, comprising:
acquiring first image data captured using at least one camera of a computing device;
determining a first position of an object represented in the first image data, the object having a property meeting or exceeding a segmentation threshold, the segmentation threshold being adjusted until the property of the object meets or exceeds the segmentation threshold;
storing a first indicator of a shape corresponding to the object;
determining a value for at least one tracking parameter for the object from the first image data;
acquiring second image data using the at least one camera of the computing device;
identifying a plurality of potential objects of interest represented in the second image data;
determining a potential indicator of a shape for each of the plurality of potential objects of interest;
determining a shape ranking of each of the plurality of potential objects of interest, the shape ranking corresponding to an amount of difference between the stored first indicator of a shape and each of the potential indicators of a shape;
correlating each of the plurality of potential objects of interest with the object based at least in part upon the first position, the shape ranking, and the value for the at least one tracking parameter, the plurality of potential objects of interest being correlated with the object in an order from a highest confidence correlation to a lowest confidence correlation; and
providing a second position of the object as determined using one or more of the plurality of correlated potential objects of interest in the second image data.

7. The computer-implemented method of claim 6, further comprising:
applying the segmentation threshold to the first image data, wherein the object corresponds to a region of the image data having the property that at least exceeds the segmentation threshold.

8. The computer-implemented method of claim 6, wherein the property is at least one of an intensity value, a color value, or a pixel value for a set of pixels corresponding to the object.

9. The computer-implemented method of claim 6, wherein the first image data and the second image data correspond to infrared light detected by the at least one camera.

10. The computer-implemented method of claim 6, wherein the at least one tracking parameter includes at least one of a size, a shape, a distance, or ballistic data associated with the object.

11. The computer-implemented method of claim 10, further comprising:
determining the distance associated with the object using at least one of a proximity sensor, an ultrasonic sensor, a capacitive sensor, a time of flight sensor, or disparity from stereoscopic image data.

12. The computer-implemented method of claim 6, further comprising:
tracking a motion of the object using a difference between the first position and the second position, the motion capable of corresponding to a determined input to the computing device.

13. The computer-implemented method of claim 6, wherein the segmentation threshold is one of an absolute threshold, a relative threshold based on an aspect of the first image data or the second image data, or a variable threshold used to identify at least one object in at least one of the first image data or the second image data.

14. The computer-implemented method of claim 6, further comprising:
determining additional data including at least one of a direction, a speed, or a velocity of motion of the object between the first position and the second position; and
using the additional data to correlate the object to a potential object of interest in an additional image captured by the at least one camera of the computing device.

15. A non-transitory computer-readable storage medium storing instructions that, when executed by at least one processor of a computing device, cause the computing device to:
apply a segmentation threshold to first image data captured using at least one camera of the computing device;
determine a first position and at least one tracking parameter for an object represented in the first image data, the object corresponding to a first region of the first image data having a property at least exceeding the segmentation threshold, the segmentation threshold being adjusted until the property of the first region at least exceeds the segmentation threshold;
determine a first indicator of a shape corresponding to the object;

apply the segmentation threshold to second image data captured using the at least one camera of the computing device;

identify a plurality of potential objects of interest represented in the second image data, each of the plurality of potential objects of interest corresponding to a respective region of the second image data having a property at least exceeding the segmentation threshold;

determine a potential indicator of a shape for each of the one or more potential objects of interest;

determine a shape ranking of each of the plurality of potential objects of interest, the shape ranking corresponding to an amount of difference between the first indicator of a shape and each of the potential indicators of a shape;

correlate each of the plurality of potential objects of interest with the object based at least in part upon the first position, the shape ranking, and the value for the at least one tracking parameter, the plurality of potential objects of interest being correlated with the object in an order from a highest confidence correlation to a lowest confidence correlation, and wherein a second position of the object being determined using one or more of the plurality of correlated potential objects of interest in the second image data.

16. The non-transitory computer-readable storage medium of claim 15, wherein the instructions when executed further cause the computing device to:

determine a first position and at least one tracking parameter for an additional object in the first image data; and correlate a another potential object of interest of the plurality of potential objects of interest with the additional object based at least in part upon the first position and a value for the at least one tracking parameter for the additional object, a second position of the additional object being determined using another one or more of the plurality of correlated potential objects of interest in the second image data.

17. The non-transitory computer-readable storage medium of claim 16, wherein the instructions when executed further cause the computing device to:

store data including at least one of the first position, the second position, or the value of the at least one tracking parameter for at least one of the first object or the second object, the data capable of being used to correlate at least one of the object and the additional object after a period of uncertainty of correlation.

18. The non-transitory computer-readable storage medium of claim 15, wherein the at least one tracking parameter includes at least one of a size, a shape, a distance, or ballistic data associated with the object.

19. The non-transitory computer-readable storage medium of claim 18, wherein a value for the at least one tracking parameter is allowed to vary by up to a determined amount when correlating the object in the first image data and the second image data.

20. The non-transitory computer-readable storage medium of claim 15, wherein the first image data and the second image data correspond to infrared light detected by the at least one camera, and wherein the property is an intensity value for the detected infrared radiation at each of a set of pixels of the first image data and the second image data.

* * * * *